US008265593B2

(12) United States Patent
Patel et al.

(10) Patent No.: US 8,265,593 B2
(45) Date of Patent: Sep. 11, 2012

(54) METHOD AND SYSTEM OF COMMUNICATION USING EXTENDED SEQUENCE NUMBER

(75) Inventors: Sarvar Patel, Montville, NJ (US); Zhibi Wang, Woodridge, IL (US)

(73) Assignee: Alcatel Lucent, Paris (FR)

( * ) Notice: Subject to any disclaimer, the term of this patent is extended or adjusted under 35 U.S.C. 154(b) by 1358 days.

(21) Appl. No.: 11/892,736

(22) Filed: Aug. 27, 2007

(65) Prior Publication Data

US 2009/0061820 A1 Mar. 5, 2009

(51) Int. Cl.
*H04M 1/66* (2006.01)
*H04L 29/06* (2006.01)

(52) U.S. Cl. .................................. 455/410; 713/159

(58) Field of Classification Search .................. 455/410, 455/411; 713/159, 186
See application file for complete search history.

(56) References Cited

U.S. PATENT DOCUMENTS

| 4,617,657 | A | * | 10/1986 | Drynan et al. ............... 370/394 |
| 5,778,071 | A | * | 7/1998 | Caputo et al. ............... 713/159 |
| 5,878,142 | A | * | 3/1999 | Caputo et al. ............... 713/159 |
| 2005/0282529 | A1 | * | 12/2005 | Thorson et al. ............... 455/415 |
| 2005/0286489 | A1 | * | 12/2005 | Shin et al. ............... 370/352 |
| 2006/0107069 | A1 | * | 5/2006 | Hoffman ............... 713/186 |
| 2007/0033391 | A1 | * | 2/2007 | Hiramatsu et al. ............... 713/153 |
| 2007/0113085 | A1 | * | 5/2007 | Naslund et al. ............... 713/168 |
| 2007/0165638 | A1 | * | 7/2007 | Hasani et al. ............... 370/392 |
| 2007/0173229 | A1 | * | 7/2007 | Dong et al. ............... 455/411 |
| 2008/0041936 | A1 | * | 2/2008 | Vawter ............... 235/380 |

FOREIGN PATENT DOCUMENTS

| EP | 1 758 417 | 2/2007 |
| EP | 1 798 896 | 6/2007 |
| WO | WO 02/052784 | 7/2002 |

OTHER PUBLICATIONS

International Search Report and Written Opinion dated Feb. 4, 2009.
*Cave-Based-2G IMS* Security, 3Gpp2 S.P0127-0, Version 0.0, , $3^{rd}$ Generation Partnership Project 2 "3GPP2", Mar. 2007.
3GPP TS 33.102 V 7.1.0, , $3^{rd}$ Generation Partnership Project 2 "3GPP2", Dec. 2006.
3Gpp TS 33.203 V 7.4.0, , $3^{rd}$ Generation Partnership Project 2 "3GPP2", Dec. 2006.
International Preliminary Report on Patentability mailed Sep. 10, 2009.
Office Action dated May 3, 2012 by the Chinese Patent Office for Application No. 2008-80104372.1 with English Translation.

* cited by examiner

*Primary Examiner* — Christopher M Brandt (74) *Attorney, Agent, or Firm* — Harness, Dickey & Pierce, P.L.C.

(57) ABSTRACT

Described is a method by mobile equipment to communicate with a network. The method includes receiving a network authentication token having a first message authentication code, an authentication message field and a first extended sequence number that includes a first hardware identifier and first sequence number, and authenticating the network based on the first message authentication code, the first hardware identifier, and the first sequence number.

17 Claims, 7 Drawing Sheets

METHOD AND SYSTEM OF COMMUNICATION USING EXTENDED SEQUENCE NUMBER

BACKGROUND

1. Field the of the Invention

The present invention relates to a method and system for wireless communication using an extended sequence number.

2. Description of Related Art

Security methods and processes relating to wireless communications have evolved in recent years. In particular, 2G CDMA security evolved into 3G CDMA security, and many of the same characteristics of 3G CDMA security are now incorporated into IMS systems as briefly described below.

As is well known in the art, 2G CDMA security involves cellular authentication and voice encryption (CAVE). Generally, in a 2G CDMA security protocol, a home location register (HLR) or authentication center (AC) of a network sends a challenge including a random number and a secondary key (SSD). The challenge is based on a 64-bit root key commonly referred to as the A-key, which is stored in the HLR or AC. In response to the challenge, the mobile equipment of a subscriber provides a response (AUTHR). The mobile equipment also stores the A-key. Accordingly, the mobile equipment using a CAVE on the random number and secondary key extracted from the challenge, and the A-key, prepares the AUTHR. The AUTHR, which is transmitted back to the HLR, allows the HLR to authenticate the mobile equipment. Conventional 2G CDMA security protocols generally do not provide mutual authentication. Because 2G CDMA security protocols are well-known in the art, further details are not described herein for the sake of brevity.

Conventional 3G CDMA security protocols are based on an authentication key agreement (AKA) and provide mutual authentication meaning (i) the mobile equipment authenticates the network and (ii) the network authenticates the mobile equipment before communications are performed. The well-known AKA security protocols used in 3G CDMA are based on quintuplets. Quintuplets include a random number RAND, expected response XRES, cipher key CK, integrity key IK and network authentication token AUTN. A conventional network authentication token AUTN is based on a sequence number SQN, an anonymity key AK, authentication management field AMF and a message authentication code MAC. It is noted that in conventional 3G CDMA security protocols, the sequence number does not include a hardware identifier of the mobile equipment.

Figure 1:
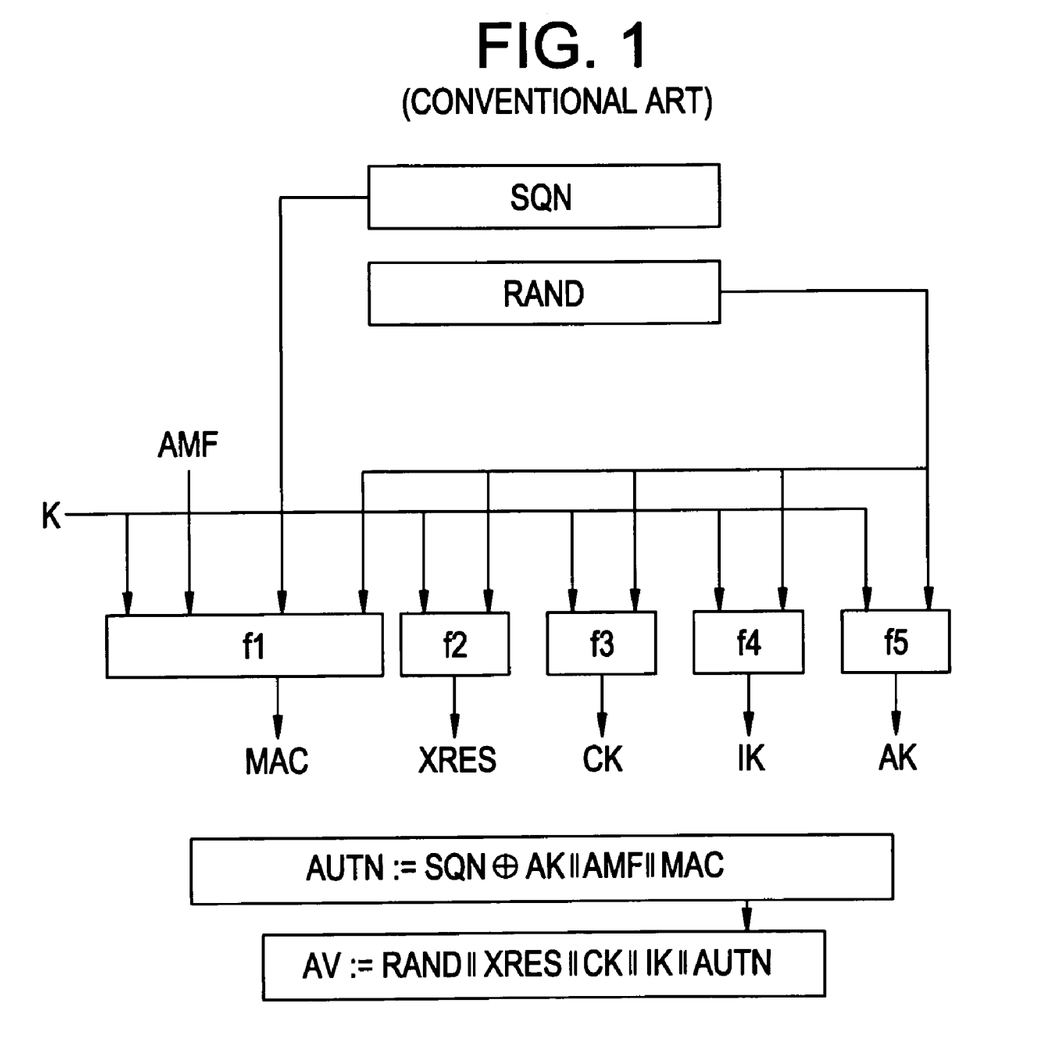
FIG. 1 illustrates a method of providing a conventional authentication vector and a conventional network authentication token, which may be used in various conventional security protocols.

FIG. 1 is a diagram illustrating a method of creating the conventional network authentication token AUTN and a conventional message authentication vector AV, which may be performed by an AC of the network.

As shown in the diagram of FIG. 1, the message authentication code MAC is generated using function f1 to process a secret key K, the authentication management field AMF, a sequence number SQN, and the random number RAND. FIG. 1 also illustrates that the remaining components of the conventional authentication vector AV is created using functions f2-f5 to process the secret key K and the random number RAND to generate an expected response XRES, cipher key CK, integrity key IK, and anonymity key AK, respectively. One skilled in the art will appreciate the functions f1-f5 could be a variety of functions well known in the art and thus, the specifics of the functions are omitted herein for the sake of brevity.

Once the conventional authentication vector AV is generated by the AC of the network, the authentication vector AV is transmitted to a serving system of the network providing service to the mobile equipment of the subscriber. The serving system extracts the network authentication token AUTN and the random number RAND from the authentication vector AV and provides the network authentication token AUTN and the random-number RAND to the mobile equipment.

As mentioned above with respect to FIG. 1, the AUTN includes the sequence number SQN, authentication management field AMF and the message authentication code MAC. The mobile equipment extracts the sequence number SQN and the message authentication code MAC from the network authentication token AUTN and authenticates the network based on the sequence number SQN and message authentication code MAC.

In particular, the mobile equipment generates its own message authentication code MAC based on a sequence number SQN stored in the mobile equipment, a secret key K stored in the mobile equipment, the AMF, and the random number RAND. Then, the message authentication code MAC generated at the mobile equipment is compared with the MAC extracted from the network authentication token AUTN received from the serving system. Still further, the mobile equipment may determine if the sequence number SQN extracted from the network authentication token is an acceptable value. For example, the mobile equipment may determine if the sequence number extracted from the network authentication token is within an acceptable range to verify the sequence number SQN. If the mobile equipment successfully authenticates the network, the mobile equipment prepares a response RES and transmits the response RES back to the serving system of the network. The serving system of the network then compares the expected response XRES with the response RES to authenticate the mobile equipment, thereby completing a mutual authentication according to the conventional AKA security protocol.

If the mobile equipment during the authentication process determines the message authentication code MAC, which was extracted from the network authentication token AUTN, does not match the MAC generated in the mobile equipment, the mobile equipment transmits a failure message to the serving system of the network. Further, if the mobile equipment during the authentication process determines the MAC value, which was extracted from the network authentication token AUTN matches the MAC value generated by the mobile equipment, but that the sequence number SQN is outside of the permissible range, the mobile equipment transmits a resynchronization message to the network. As previously mentioned, the AKA security protocol used in 3G CDMA is well known in the art and thus, further information is not provided herein for the sake of brevity.

Conventional IMS security protocols have essentially incorporated the quintuplet based AKA security protocol described above with respect to 3G CDMA. However, in the IMS security mechanism, an HTTP AKA digest is located in an intermediary network component between the AC and the mobile equipment. For example, the HTTP AKA digest may be included in the S-CSCF of an IMS network. The HTTP AKA digest reconfigures the conventional authentication vector AV to be in the proper format for processing by various other components of the IMS network. Further details on the specifics of the HTTP AKA digest and AKA security protocol conventionally used in an IMS network can be found in the 3GPP TS 33.203 VT.4.0 standard published in December of 2006. As such, further details of the conventional IMS security protocols are omitted herein for the sake of brevity.

While security protocols have evolved by transitioning from 2G CDMA security protocols to 3G CDMA security protocols, which are also implemented in conventional IMS security protocols, some of the hardware equipment used for wireless communications has not been updated and/or is not capable of processing the more highly evolved protocols. For example, some companies which may have invested significant amounts of time, research and money in hardware used to process 2G CDMA security protocols have chosen not to update the hardware for various cost associated reasons. For example, some wireless devices such as mobile phones, PDAs, etc. are only capable of extracting the random number RAND and sequence number SQN from a challenge, as discussed above with respect to the 2G CDMA security protocols, and providing a response AUTHR consistent with the 2G CDMA security protocol. Therefore, some conventional 2G CDMA hardware devices are not currently capable of providing a mutually authenticated communication channel with an IMS network.

SUMMARY

Example embodiments provide methods and apparatuses related to establishing communications between mobile equipment and a network using an extended sequence number. According to example embodiments, the extended sequence number includes at least a portion of the hardware identifier of the mobile equipment.

An example embodiment provides a method performed by mobile equipment to communicate with a network. The method includes receiving a network authentication token having a first message authentication code and a first extended sequence number that includes a first hardware identifier and first sequence number; and authenticating the network based on the first message authentication code and the first sequence number. The method performed by the mobile equipment may further include extracting the first message authentication code and the first extended sequence number from the network authentication token; calculating a second message authentication code based on the random number, the first extended sequence number, and a key stored in the mobile equipment; and separating the first extended sequence number to obtain the first hardware identifier and a first sequence number.

According to an example embodiment, the authenticating step compares the first message authentication code with the second message authentication code, the first hardware identifier with a second hardware identifier stored in the mobile equipment, and the first sequence number and a second sequence number stored in the mobile equipment; and authenticates the network if the first message authentication code matches the second message authentication code, the first hardware identifier matches the second hardware identifier, and the first sequence number is greater than the second sequence number.

According to an example embodiment, the first hardware identifier refers to a mobile equipment associated with a subscriber of the network and the second hardware identifier identifies the mobile equipment that received the network authentication token and random number.

According to an example embodiment, the method performed by the mobile equipment further includes generating a resynchronization pair if at least one of the first message authentication code does not match the second message authentication code, the first hardware identifier does not match the second hardware identifier, and the first sequence number is less than the second sequence number; and transmitting the resynchronization pair to the network.

According to an example embodiment, the method performed by the mobile equipment further includes reallocating bits of a first protocol resynchronization pair having a preset number of bits assigned to each of a first protocol resynchronization message and a first protocol sequence number; transmitting a second resynchronization pair having the same number of bits as the first protocol resynchronization pair. The bits reallocated in the reallocating step are used as bits of the second extended sequence number that has a greater number of bits than the first protocol sequence number.

Another example embodiment provides a method performed by a network to communicate with mobile equipment. The method includes transmitting a random number and an authentication token having a first extended sequence number, which includes a hardware identifier of the mobile equipment associated with a subscriber; and receiving a response from the transmitting step, the response being at least one of a cryptographic transformation of the random number and a resynchronization pair including a second extended sequence number and a resynchronization message.

According to an example embodiment, the method performed by the network further includes generating a first authentication vector including the network authentication token. The first authentication vector is a concatenation of the random number, an expected response, a cipher key, an integrity key, and the authentication token.

According to an example embodiment, the method performed by the network further includes comparing the response from the transmitting step to the expected response; and authenticating the mobile equipment if the response from the transmitting step matches the expected response.

According to an example embodiment, the method performed by the network further includes comparing the response from the transmitting step to the expected response; and generating a second authentication vector including a second network authentication token having the second extended sequence number if the response from the transmitting step does not match the expected response; and transmitting the second authentication token to the mobile equipment.

According to an example embodiment, the method performed by the network further includes detecting an indicator included in the response from the transmitting step; authenticating the mobile if the indicator indicates the response is a cryptographic transformation of the random number and the cryptographic transformation of the random number matches the expected response; and generating a second authentication vector including a second network authentication token having the second extended sequence number if the indicator indicates the response is the resynchronization pair; and transmitting the second authentication token to the mobile equipment.

According to an example embodiment, the method performed by the network further includes reallocating bits of a first protocol network authentication token, which has a preset number of bits assigned to each of a first protocol sequence number and a message authentication code; and generating an authentication vector including a second protocol network authentication token. The second protocol network authentication token has the same number of bits as the first protocol network authentication token, and the reallocated bits are used as bits of the first extended sequence number that has a greater number of bits than the first protocol sequence number.

Still another example embodiment provides a method of establishing a mutually authenticated communication channel between mobile equipment and a network. The method includes (a) generating an expected response, a random number, and a network authentication token including a first message authentication code and a first extended sequence number having a first hardware identifier being associated with the mobile equipment by the network; (b) transmitting the random number and the network authentication token from the network to the mobile equipment; (c) receiving the random number and the network authentication token at the mobile equipment; (d) authenticating the network based on the network authentication token; (e) transmitting a cryptographic transformation of the random number from the mobile equipment to the network; (f) authenticating the mobile equipment if the cryptographic transformation of the random number matches the expected response; and (g) establishing a mutually authenticated channel between the mobile station and the network.

According to an example embodiment, the network authenticating step (d) extracts the first message authentication code, and the first extended sequence number from the authentication token; calculates a second message authentication code based on the random number, the first extended sequence number, and a key stored in the mobile equipment; separates the first extended sequence number to obtain the first hardware identifier and a first sequence number; compares the first message authentication code with the second message authentication code, the first hardware identifier with a second hardware identifier stored in the mobile equipment, and the first sequence number with a second sequence number stored in the mobile equipment; and authenticates the network if the first message authentication code matches the second message authentication code, the first hardware identifier matches the second hardware identifier, and the first sequence number is greater than the second sequence number.

According to an example embodiment, the method of establishing the mutually authenticated channel further includes resynchronizing the mobile equipment and the network if at least one of the first message authentication code does not match the second message authentication code, the first hardware identifier does not match the second hardware identifier, and the first sequence number is less than the second sequence number.

According to an example embodiment, the resynchronizing step includes concatenating the second hardware identifier and the second sequence number to create a second extended sequence number; calculating a resynchronization message based on the random number, the second extended sequence number, and a key stored in the mobile equipment; grouping the second extended sequence number with the resynchronization message to form the resynchronization pair; transmitting the resynchronization pair; generating a second network authentication token using the second extended sequence number, and repeating the steps (b)-(f) referred to above while substituting the second network authentication token for the network authentication token.

Another example embodiment provides a method performed by mobile equipment to communicate with a network. The method includes receiving a network authentication token having a first message authentication code and a first extended sequence number that includes a hash of a first hardware identifier and first sequence number; and authenticating the network based on the first message authentication code, the hash of the first hardware identifier, and the first sequence number.

Another example embodiment provides a method performed by a network to communicate with mobile equipment. The method includes transmitting a random number and an authentication token having a first extended sequence number, which includes a hash of a first hardware identifier of the mobile equipment associated with a subscriber; and receiving a response from the transmitting step. The response is at least one of a cryptographic transformation of the random number and a resynchronization pair including a second extended sequence number and a resynchronization message.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 2:
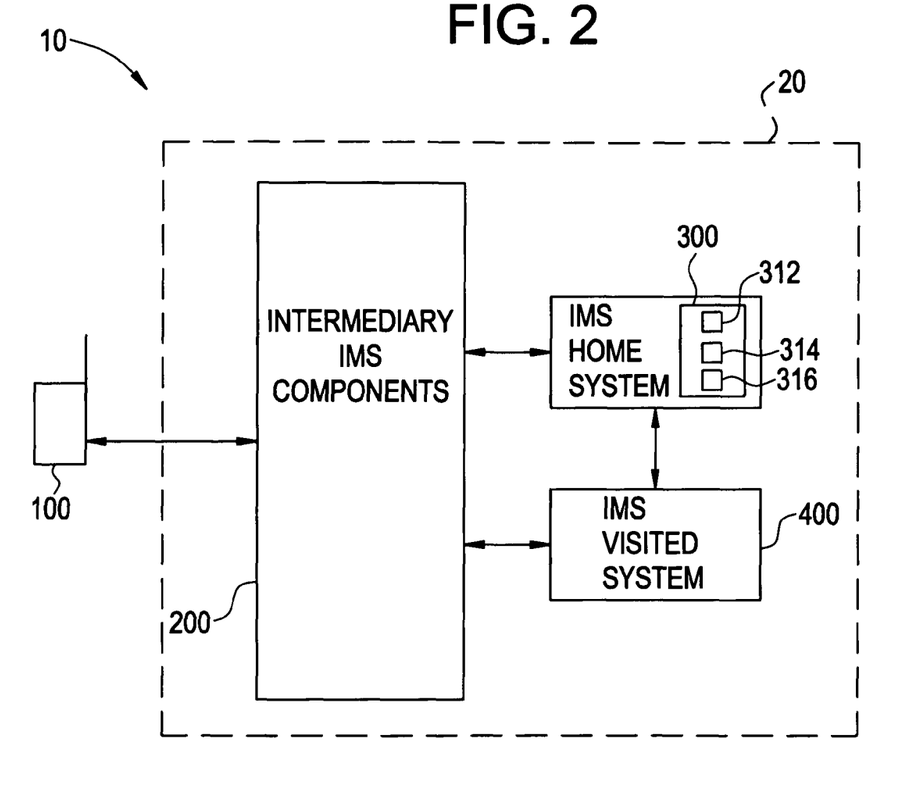
FIG. 2 illustrates a communication system according to an example embodiment.

FIG. 2 illustrates a communication system 10 including at least one mobile station 100 and a network 20. One skilled in the art will appreciate that the network 20 should not be limited to the abbreviated portion of an IP multi-media subsystem (IMS), which is illustrated in the embodiment of FIG. 2. In FIG. 2, the IMS network 20 includes an IMS home system 300, an IMS visited system 400 and intermediary IMS components 200. While the intermediary IMS components 200 are merely shown as a block in the network 20, one skilled in the art will appreciate that the intermediary IMS components 200 may include, for example, a P-CSCF, and I-CSCF, an HSS, and an S-CSCF arranged between the mobile equipment 100 and the IMS home system 300 and IMS visited system 400. The IMS home system 300 and the IMS visited system 400 may communicate with each other directly or via the intermediary IMS components 200 to provide service to the mobile equipment 100. The location of the mobile equipment, type of service requested by the mobile equipment, etc., may determine whether the IMS home system 300 or the IMS visited system 400 provides the requested service to the mobile equipment 100.

According to the example embodiment as described with respect to FIG. 2, the IMS home system 300 includes an authentication center 310. The simplified version of the authentication center 310 illustrated in FIG. 2 includes a memory 312, a processor 314, and a transceiver 316. Obviously one skilled in the art will appreciate that the authentication center 310 is more complex than the simplified version illustrated in FIG. 2 and may include one or more computer systems.

Figure 3:
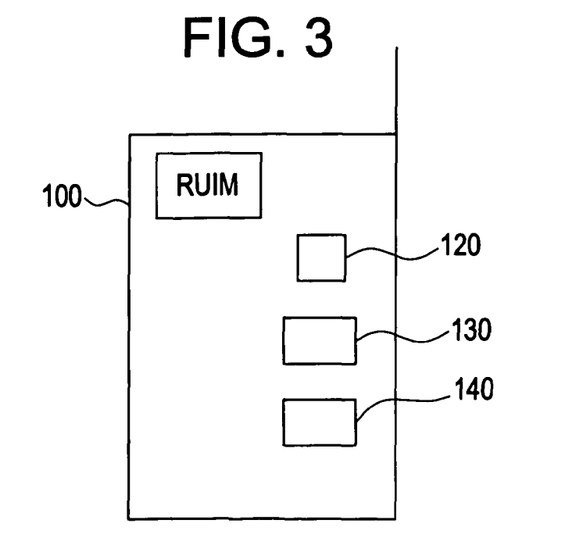
FIG. 3 illustrates a mobile equipment according to an example embodiment.

FIG. 3 illustrates an example embodiment of mobile equipment 100. As shown in FIG. 3, the mobile equipment 100 includes a removable user identity module RUIM, a memory 120, a processor 130 and a transceiver 140. The removable user identity module RUIM included in the mobile equipment 100 is a conventional removable user identity module RUIM. For example, the removable user identity module RUIM may be a module that was developed to function according to the 2G CDMA security protocols. As such, the removable user identity module RUIM may store a MIN/IMSI/TMSI as is well known in the art and will not be discussed further herein for the sake of brevity. The memory 120 and the processor 130 of the mobile equipment 100 may be used to perform example embodiments of methods described below with respect to the signal flow diagram of FIG. 5 and the flow chart of FIG. 6.

Figure 4:
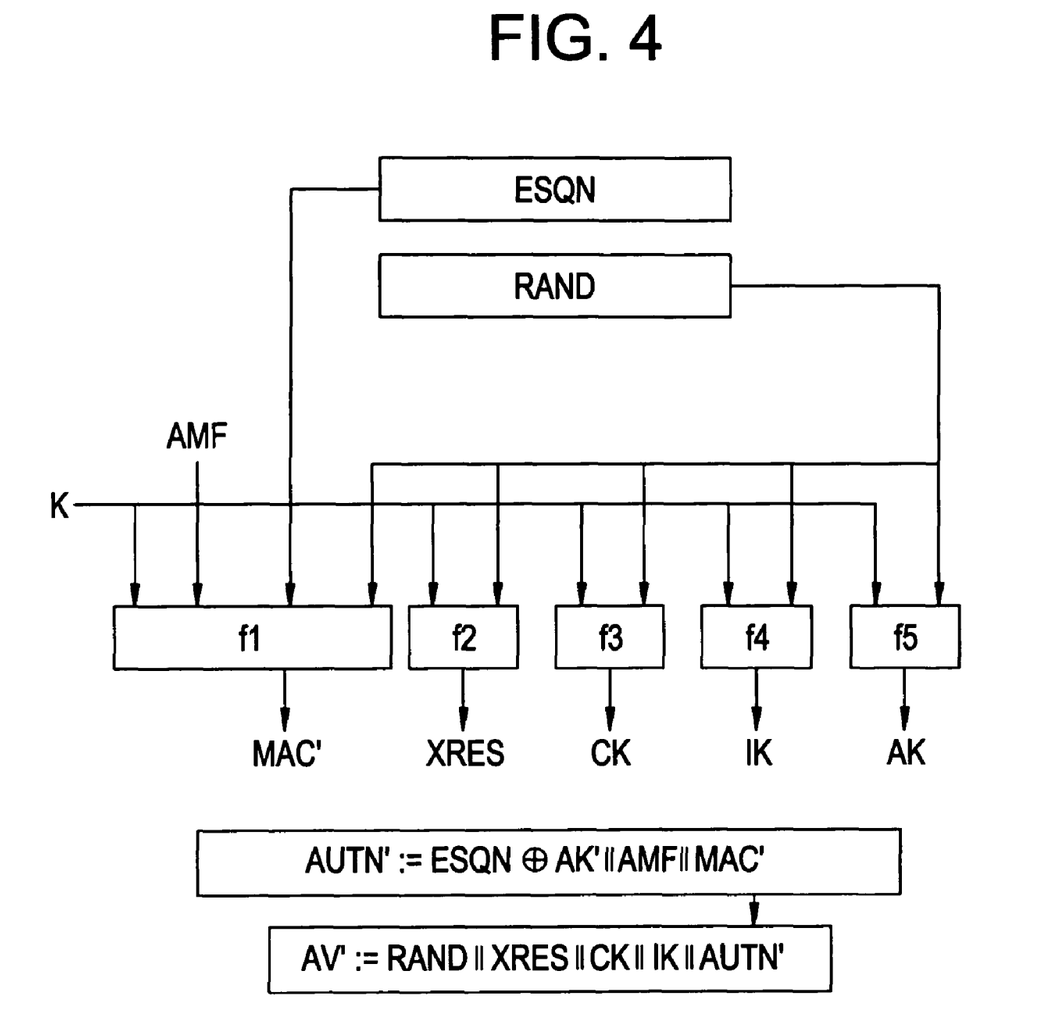
FIG. 4 illustrates a method of generating a network authentication token and authentication vector according to an example embodiment.

Before describing example embodiments of methods for authentication according to the present invention, introduction of an extended sequence number used in the methods is explained with respect to FIG. 4.

According to example embodiments, the mobile equipment 100 and the authentication center 310 provide additional functionality to address deficiencies of the conventional removable unit identity module RUIM 110 included in the mobile equipment 100. The example embodiment of the mobile equipment 100 and the example embodiment of the authentication center 310 do this using an extended sequence number ESQN. An extended sequence number ESQN according to an example embodiment is a globally non-repeating sequence number for all mobile equipment. According to one example embodiment, the extended sequence number ESQN includes a hardware identifier of a subscriber's mobile equipment 100 and an example embodiment of a sequence number SQN'. In particular, the extended sequence number ESQN is the hardware identifier of the mobile equipment 100 concatenated with the sequence number SQN'.

Because the ESQN includes the hardware identifier of a subscriber's mobile equipment 100, and each mobile equipment 100 has a different hardware identifier, the ESQN is different for each mobile equipment 100. Further, because the ESQN includes a sequence number SQN', the ESQN may be incremented for each system access similar to how a sequence number SQN is incremented in a conventional AKA security protocol. Stated differently, the ESQN does not repeat within a mobile equipment 100 and is different for each different mobile equipment 100 that the removable user identity module RUIM is inserted into. According to one example, an ESQN includes 104 bits with 56 bits being allocated to the hardware identifier and 48 bits being allocated to an example embodiment of a sequence number SQN'.

According to an example embodiment, the sequence number SQN' included in an extended sequence number ESQN may be based on a time determined by the mobile equipment 100, or on a counter value, for example. A time based sequence number SQN' is determined based on a clock value that may be 0.1 seconds, for example, so that no two batch request may arrive simultaneously. An example of a sequence number SQN' based on time includes 47 bits in which 5 of the 47 bits are used for array management. This example sequence number SQN' would support approximately 65 years of operations. An example of a sequence number SQN' based on a counter includes 34 bits assuming 1 AKA/sec is the worst case rate, a lifetime of a mobile equipment 100 is around 15 years and a mechanism for allowing interleaving of requests from different visited IMS systems 400 is used requires 5 of the 34 bits. As indicated by these two examples, the number of bits for the sequence number SQN' may vary depending on the characteristics of the IMS network 20 and/or the mobile equipment 100.

FIG. 4 is a diagram illustrating how the extended sequence number ESQN may be used in an authentication center 310 to generate an example embodiment of the authentication vector AV'. The memory 312 of the authentication center 310 may store various values such as a secret key K and various functions represented by f6-f10 used by the processor 314 of the authentication center 310 to generate the authentication vector AV'. One skilled in the art will appreciate the functions f6-f10 could be a variety of functions well known in the art and thus, the specifics of the functions are omitted herein for the sake of brevity.

As illustrated in FIG. 4, the processor 312 generates a message authentication code MAC' value by performing the process f6 with the secret key K, authentication message field AMF, extended sequence number ESQN, and random number RAND. Further, the processor 314 generates a expected response XRES based on the secret key K and the random number RAND using the process f7; generates the cipher key CK based on the secret key K and the random number RAND with the process f8; generates the integrity key IK based on the secret key K and the random number RAND using process f9; and generates the anonymity key AK' based on the secret key K and random number RAND using process f10. The processor 314 may then generate an example embodiment of an authentication token AUTN' using equation (1) shown below.

$$\text{AUTN'}:=\text{ESQN} \oplus \text{AK'} \| \text{AMF} \| \text{MAC'} \quad (1)$$

As such an authentication vector AV' according to an example embodiment is based on the extended sequence number ESQN, anonymity key AK', authentication message field AMF, and message authentication code MAC'.

Still further, the processor 314 calculates an example embodiment of an authentication vector AV' based on equation (2) shown below.

$$\text{AV'}:=\text{RAND} \| \text{XRES} \| \text{CK} \| \text{IK} \| \text{AUTN'} \quad (2)$$

As illustrated by equation 2, an example embodiment of an authentication vector AV' may be a concatenation of the random number RAND, expected response XRES, cipher key CK, integrity key IK, and network authentication token AUTN'.

Figure 5:
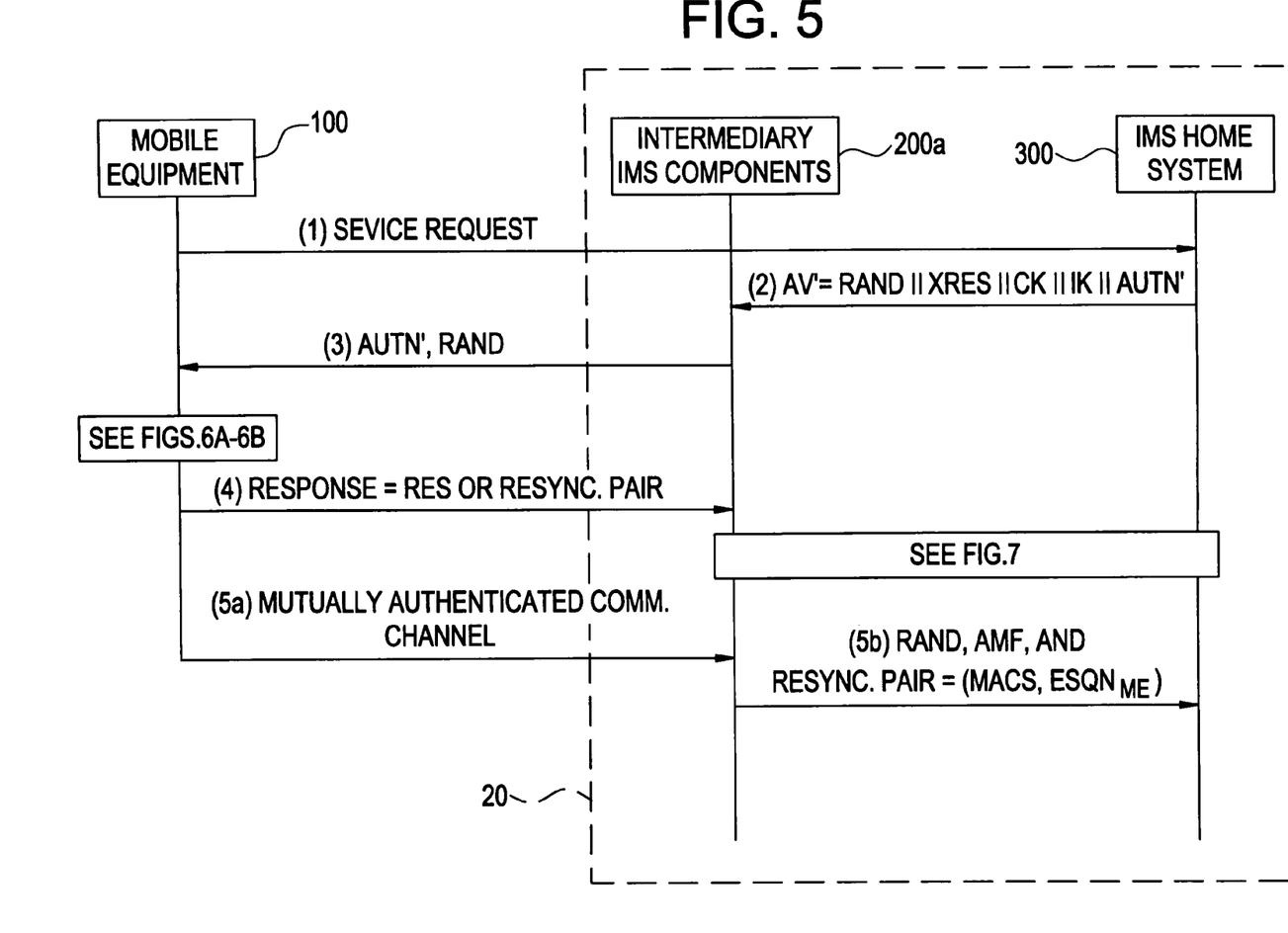
FIG. 5 illustrates an example embodiment of a signal flow diagram.

FIG. 5 is a signal flow diagram illustrating communications between the mobile equipment 100, intermediary IMS components 200a and the IMS home system 300 according to an example embodiment. It is noted that the intermediary IMS components 200a differ slightly from the intermediary IMS components 200 shown in FIG. 2 in that intermediary IMS components 200a is considered to include the IMS visited system 400, which is considered the serving system in the example embodiment described below with respect to FIG. 5. In addition to the IMS visited system 400, the intermediary IMS components 200a may further include a P-CSCF, an I-CSCF, a HSS, an S-CSCF, for example.

FIG. 5 illustrates the mobile equipment 100 sending a service request to the IMS home system 300 requesting service (1). In response to the service request, the IMS home system 300 generates an example embodiment of an authentication vector AV', as previously described with respect to FIG. 4.

Once the IMS home system 300 generates the authentication vector AV', the IMS home system 300 provides the authentication vector AV' to the intermediary IMS components 200a (2). The intermediary IMS components 200a then process the authentication vector AV' to extract the random number RAND, the expected response XRES, the cipher key CK, the integrity key IK, and the network authentication token AUTN' from the authentication vector AV'. The intermediary IMS components 200a determine the extended sequence number ESQN and a first message authentication code MAC' from the network authentication token AUTN' and store the expected response XRES, cipher key CK and integrity key IK, which are used to process a later response received from the mobile equipment 100.

The intermediary IMS components 200a provide the network authentication token AUTN' and the random number RAND to the mobile equipment 100 (3). The mobile equipment 100 receives and processes the network authentication vector AUTN' and the random number RAND to authenticate the IMS network 20.

Figure 6A:
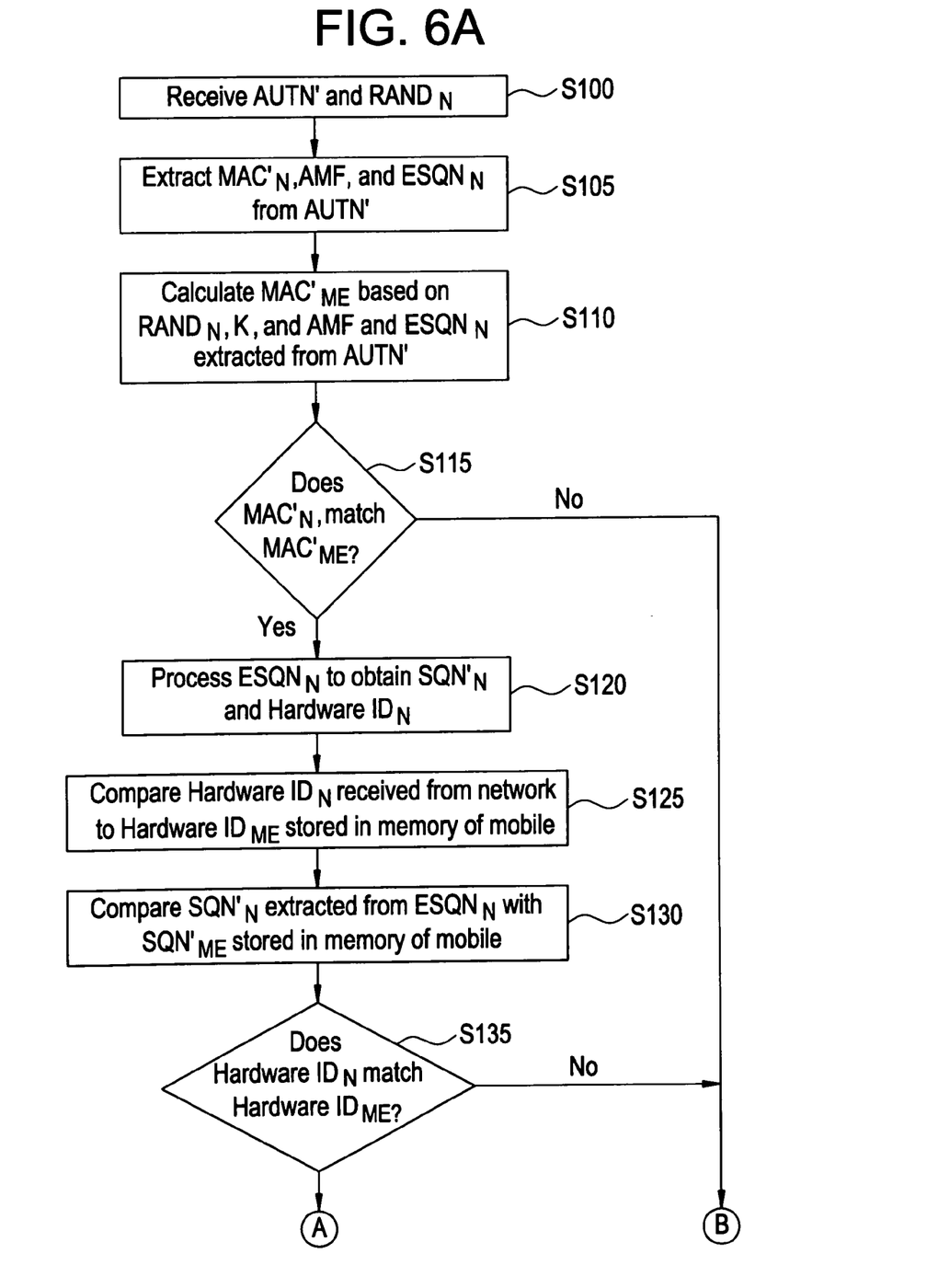
FIGS. 6A and 6B are a flow chart illustrating an example embodiment of a method performed by a mobile equipment to authenticate a network.
Figure 6B:
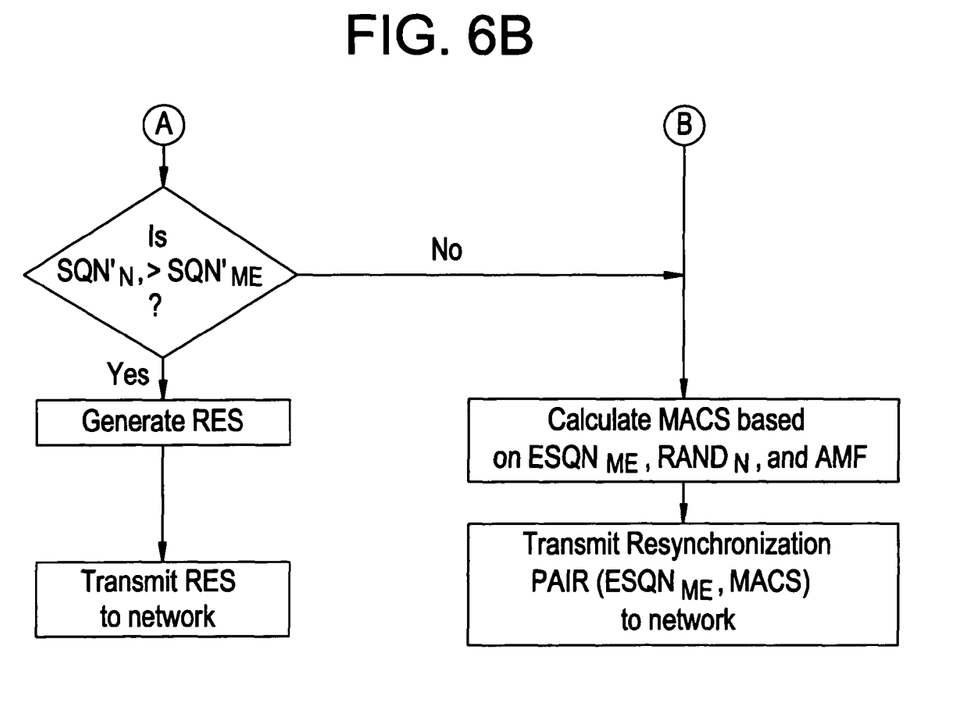

The flow chart shown in FIGS. 6A-6B illustrates an example embodiment of a method performed by the mobile equipment 100 to authenticate the IMS network 20. In step S100 of FIG. 6, the transceiver 140 of the mobile equipment 100 receives the network authentication token AUTN' and the random number $RAND_N$ from the intermediary IMS components 200a. The transceiver 140 may provide the network authentication token AUTN' and the random number $RAND_N$ to the processor 130 and/or store the network authentication token AUTN' and the random number $RAND_N$ in the memory 120, which can be accessed by the processor 130.

In step S105, the mobile equipment 100 extracts the first message authentication code $MAC'_N$, the first extended sequence number $ESQN_N$, and the authentication message field AMF from the network authentication token AUTN'. In particular, the processor 130 extracts the first message authentication code $MAC'_N$, the first extended sequence number $ESQN_N$, and the authentication message field AMF from the network authentication token AUTN' and stores the first message authentication code $MAC'_N$, the first extended sequence number $ESQN_N$ and the authentication message field AMF in the memory 120 of the mobile equipment 100.

In step S110 of FIG. 6, the mobile equipment 100 calculates a second message authentication code $MAC'_{ME}$. The second message authentication code $MAC'_{ME}$ is calculated using a secret key K stored in the removable unit identity module RUIM, the random number $RAND_N$ received from the network 20, and the first extended sequence number $ESQN_N$ and authentication message field AMF extracted from the network authentication token AUTN' in step S105. For example, the processor 130 combines the secret key k, the first extended sequence number $ESQN_N$, the random number $RAND_N$ and the authentication message field AMF using function f6, which was previously mentioned in the description of FIG. 4, to generate the second message authentication code $MAC'_{ME}$.

In step S115, the mobile equipment 100 determines if the first message authentication code $MAC'_N$ matches the second message authentication code $MAC'_{ME}$. The processor 130 of the mobile equipment 100 may make this determination. Based on the determination of the processor 130 of the mobile equipment 100, the processor 130 may perform step S120 or step S155. In particular, if the processor 130 determines the first message authentication code $MAC'_N$ matches the second message authentication code $MAC'_{ME}$, the processor 130 performs step S120, whereas if the processor 130 determines the first message authentication code $MAC'_N$ does not match the second message authentication code $MAC'_{ME}$, the processor performs step S155. Because step S155 is described in greater detail below with respect to FIG. 6b, this description of an example embodiment will proceed under the assumption that the first message authentication code $MAC'_N$ matches the second message authentication code $MAC'_{ME}$. It noted that according to another example embodiment, a failure signal is transmitted to the network 20 if the mobile equipment 100 determines the first message authentication code $MAC'_N$ does not match the second message authentication code $MAC'_{ME}$. Further, because all the variable used to calculate the first message authentication code $MAC'_N$ and the second message authentication code $MAC'_{ME}$ are the same except the respective secret keys $K_N$ and a $K_{ME}$ and the function, there is an increased likelihood that one or more components of the network 20 and/or mobile equipment 100 has suffered a malfunction and thus, be unable to resynchronize.

In step S120, the mobile equipment 100 processes the first extended sequence number $ESQN_N$ extracted from the network authentication token AUTN'. For example, the processor 130 separates the first extended sequence number $ESQN_N$ into the first sequence number $SQN'_N$ and a first hardware identifier $ID_N$. The first hardware identifier $ID_N$ is the hardware identifier the network 20 associates with a subscriber of the IMS service. For example, when a subscriber registers for service, the subscriber may provide the authentication center 310 of the IMS home system 300 with the hardware identifier of the subscriber's mobile equipment and the authentication center may store this information in a subscriber profile stored in the memory 314, for example.

In step S125, the mobile equipment 100 compares the first hardware identifier $ID_N$ with the second hardware identifier $ID_{ME}$. The second hardware identifier $ID_{ME}$ is the hardware identifier of the mobile equipment 100 in which the removable unit identity module RUIM used by the used subscriber is inserted. The processor 130 may obtain the second hardware identifier $ID_{ME}$ from the memory 120 and compare the obtained second hardware identifier $ID_{ME}$ with the first hardware identifier $ID_N$.

In step S130, the mobile equipment 100 compares the first sequence number $SQN'_N$ obtained from the first extended sequence number $ESQN_N$ with the second sequence number $SQN'_{ME}$. The processor 130 may obtain the second sequence number $SQN'_{ME}$ from the memory 140 and compare the obtained second sequence number $SQN'_{ME}$ with the first sequence number $SQN'_N$.

In step S135, the mobile equipment 100 determines if the first hardware identifier $ID_N$ matches the second hardware identifier $ID_{ME}$. The processor 130 may determine if both the first hardware identifier $ID_N$ matches the second hardware identifier $ID_{ME}$ by obtaining values stored in the memory 140. For example, a 1 may be stored in the memory 120 if step S135 indicates that the first hardware identifier $ID_N$ matches the second hardware identifier $ID_{ME}$, and a 0 may be stored in the memory 140 if the first hardware identifier $ID_N$ does not match second hardware identifier $ID_{ME}$. If the processor 130 determines the first hardware identifier $ID_N$ matches the second hardware identifier $ID_{ME}$, the processor 130 performs step S140, whereas if the processor 130 determines the first hardware identifier $ID_N$ does not match the hardware identifier $ID_{ME}$, the processor performs step S155. This description of an example embodiment will proceed under the assumption that the first hardware identifier $ID_N$ matches the second hardware identifier $ID_{ME}$.

In step S140 of FIG. 6B, the mobile equipment 100 determines if the first sequence number $SQN'_N$ obtained from the first extended sequence number $ESQN_N$ is greater that a second sequence number $SQN'_{ME}$. The second sequence number $SQN'_{ME}$ is stored in the memory 120 of the mobile equipment 100 and may be based on time or a counter value as previously discussed. The processor 130 determines the first sequence number $SQN'_N$ is a valid sequence number if the first sequence number $SQN'_N$ is greater than the second sequence number sequence number $SQN'_{ME}$ stored in the memory 120. Further, the processor 130 determines the first sequence number $SQN'_N$ is an invalid sequence number if the first sequence number $SQN'_N$ is less than the second sequence number $SQN'_{ME}$ stored in the memory 120. If the first sequence number $SQN'_N$ is determined to be a valid sequence number, the first sequence number $SQN'_N$ may be stored in the memory 120 by the processor 130 and used as the second sequence number $SQN'_{ME}$ in processes the next time a network authentication token AUTN' and random number $RAND_N$ are received from the intermediary IMS components 200a.

As shown in FIG. 6B, the mobile equipment 100 performs step S145 if the mobile equipment 100 determines the first sequence number $SQN'_N$ is a valid sequence number. In step S145, the mobile equipment 100 generates a response message RES. For example, the processor 130 generates a response message RES by combining the random number $RAND_N$ received from the intermediate IMS components 200a with the secret key $K_{ME}$ stored in the removable unit identity module RUIM using function f7. Function f7 was previously mentioned with respect to FIG. 4.

In step S150, the mobile equipment 100 transmits the response message RES to the IMS network 20. For example, the transceiver 140 transmits the response message RES to the intermediary IMS components 200a of the IMS network 20.

As shown in FIGS. 6A and 6B, the mobile equipment 100 performs step S155 if the mobile equipment 100 determines at least one of (i) the first message authentication code $MAC'_N$ does not match the second message authentication code $MAC'_{ME}$, (ii) the first hardware identifier $ID_N$ does not match the second hardware $ID_{ME}$, and (iii) the first sequence number $SQN'_N$ is not greater than the second sequence number $SQN'_{ME}$.

For example, condition (ii) is satisfied when the removable unit identity module RUIM is removed from a first mobile equipment and placed in a second mobile equipment that is different from the first mobile equipment. Because the hardware identities of the first and second mobile equipment are different, the network 20 would be using the hardware identifier $ID_N$ of the first mobile equipment, which may have been the mobile equipment used by a subscriber when the subscriber first registered for an IMS service, and the hardware identifier $ID_{ME}$ being used by the second mobile equipment is the hardware identifier of the second mobile equipment, which includes the removable unit identity module RUIM.

Still referring to FIG. 6B, the mobile equipment 100 generates a resynchronization pair (MACS, $ESQN_{ME}$), which includes a resynchronization message MACS and the second extended sequence number $ESQN_{ME}$ in step S155. The resynchronization message MACS is calculated in a manner similar to the second message authentication code $MAC'_{ME}$. However, resynchronization message MACS includes the second extended sequence number $ESQN_{ME}$ instead of the first extended sequence number $ESQN_N$ obtained from the network authentication token AUTN'. To generate the resynchronization message MACS, the processor 130 of the mobile equipment 100 combines the second extended sequence number $ESQN_{ME}$ with the random number $RAND_N$ and the authentication management field AMF using a function f6*, which is different from function f6 used to calculate the first message authentication code $MAC'_N$ and the second message authentication code $MAC'_{ME}$.

In step S160 of FIG. 6B, the mobile equipment 100 transmits the generated resynchronization pair (MACS, $ESQN_{ME}$) to the IMS network 20. For example, the transceiver 140 of the mobile equipment 100 transmits the resynchronization pair (MACS, $ESQN_{ME}$) including the resynchronization message MACS and the second extended sequence number $ESQN_{ME}$ to the intermediary IMS components 200a of the IMS network 20.

Referring back to FIG. 5, a response is transmitted from the mobile equipment 100 to the intermediary IMS components 200a of the IMS network 20 (4). According to an example embodiment, the response is either the response message RES generated in step S145 of FIG. 6B or the resynchronization pair (MACS, $ESQN_{ME}$) generated in step S155 of FIG. 6B.

Figure 7:
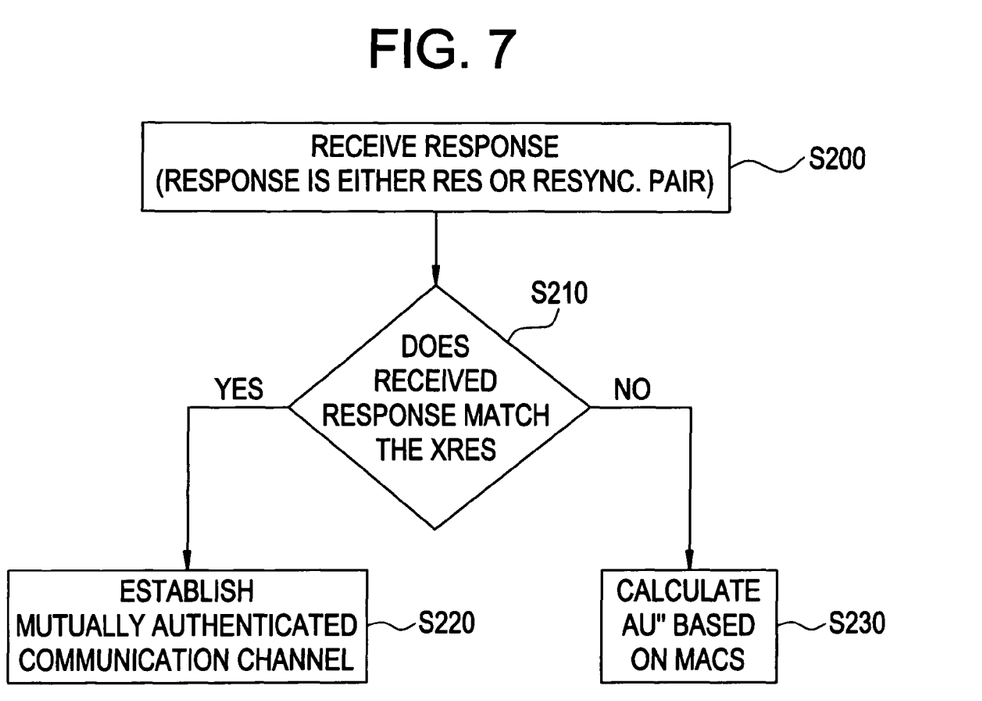
FIG. 7 is a flow chart illustrating an example embodiment of a method performed by a network to authenticate a mobile equipment.

FIG. 7 is a flow chart illustrating an example embodiment of a method performed by the IMS network 20. In step S200 of FIG. 7, the IMS network 20 receives the response transmitted by the mobile equipment 100. For example, the intermediary IMS components 200a receive the response transmitted by the transceiver 140 of the mobile equipment 100.

In step S210 of FIG. 7, the IMS network 20 compares the received response with the expected response XRES previously obtained from the authentication vector AV'. For example, the intermediary IMS components 200a compare the received response RES to the expected response XRES previously extracted from the authentication vector AV' provided by the IMS home system 300. It is noted that while step S210 illustrates an actual comparison of the received response with the expected response XRES, an alternative embodiment detects an indicator included in the received response and determines if the received response is a response message RES or a resynchronization pair (MACS, $ESQN_{ME}$) from the indicator.

Assuming the IMS network 20 performs step S220 illustrated in FIG. 7, the received response matches the expected response XRES. The received response may match expected response XRES if the received response is a response message RES. In step S220, the intermediary IMS components 200a establish a mutually authenticated communication channel between mobile equipment 100 and the network 20 over which various services provided by an IMS serving system may be provided. The IMS serving system may be the IMS home system 300 or the IMS visited system 400. However, as previously mentioned, the serving system in this example embodiment is considered to be the IMS visited system 400 which is included in the intermediary IMS components 200a. The establishment of the mutually authenticated communication channel is represented in FIG. 5 by (5a). Secure communication is provided over the mutually authenticated communication channel at least in part because both the mobile equipment 100 and the network 20 possess the cipher key CK and the integrity key IK.

Alternatively, the IMS network 20 performs step S230 when the received response does not match the expected response XRES. For example, if the received response is the resynchronization pair (MACS, $ESQN_{ME}$), the intermediary IMS components 200a of the IMS network 20 will determine the received response does not match the expected response XRES.

In step S230, the IMS network 20 calculates another authentication vector AV'" based on the second extended sequence number $ESQN_{ME}$ included in the resynchronization pair (MACS, $ESQN_{ME}$). For example, referring back to FIG. 5, the intermediary IMS components 200a transmit the resynchronization pair MACS, $ESQN_{ME}$) along with the authentication management field AMF and the random number RAND$_N$ to the IMS home system 300 (5b). The IMS home system 300 extracts the second extended sequence number ESQN$_{ME}$ from the resynchronization pair (MACS, ESQN$_{ME}$) and uses the random number RAND$_N$, the authentication message field AMF, and the secret key K$_N$ to generate the authentication vector AV'" as was previously described with respect to FIG. 4. The previously described steps illustrated in the signal diagram of FIG. 5 and the flow charts of FIGS. 6A, 6B and 7 are then repeated as necessary.

As described above, example embodiments use an extended sequence number ESQN to establish a mutual authentication channel between a home IMS system 300 and/or a visited IMS system 400. Further, an extended sequence number ESQN may be a hardware identifier concatenated with a sequence number SQN. Accordingly, if hardware identifier is 56 bits, the extended sequence number ESQN is 56 bits longer than a conventional sequence number.

Accordingly, the additional example embodiments described below are directed towards compensating for the increased length of the ESQN.

Referring back to FIG. 5, signal (3) illustrates the intermediary IMS components 200a transmitting the authentication token AUTN' and the random number RAND to the mobile equipment 100. In the following example embodiment, an assumption is made that the intermediary IMS components 200a have a limited number of bits, which may be transmitted to the mobile equipment 100. The limited number of bits corresponds to a number of bits required to transmit a random number RAND and authentication token AUTN used in conventional methods such as the IMS security protocols described in the background section of this disclosure. For example, assume the limited number of bits is 200 bits and 80 of the bits are allocated for the random number RAND with the 120 remaining bits being allocated for the authentication token AUTN. In this example, the 120 bits of the authentication token are allocated as follows: 48 bits allocated to a conventional sequence number SQN (or the sequence number SQN masked with the anonymity key AK), 16 bits allocated to AMF and 56 bits allocated to the message authentication code MAC.

Based on the above assumptions, in order for the intermediary IMS components 200a to perform according to the example embodiments described with respect to FIGS. 5, 6A, 6B and 7, the mobile equipment 100 and the authentication center 310 reallocate the limited number of bits so that the bits of the hardware identifier can be included in the transmission. Further, assume the hardware identifier is 56 bits and thus, 56 bits of the 200 bits, i.e., the limited number of bits, must be reallocated.

In one example of reallocating bits, the authentication center 310 only includes a 34 bit sequence number SQN'$_N$ in an example embodiment of the authentication vector AV' instead of the 48 bits originally allocated to the sequence number SQN, thereby reallocating 14 bits for the hardware identifier ID$_N$. In addition, the authentication center 310 may only include a 38 bit random number RAND in the example embodiment of the authentication vector AV' instead of the 80 bits originally allocated to the sequence number SQN, thereby reallocating 42 bits for the hardware identifier ID$_N$. As such, 56 bits are reallocated by the authentication center 310 for the hardware identifier ID$_N$ by reducing the number of bits of the sequence number SQN by 14 and reducing the number of bits of the random number by 42 bits.

In another example of reallocating bits, the mobile equipment 100 may reallocate bits assigned to a conventional resynchronization message used in conventional IMS security protocols to accommodate the bits of the hardware identifier ID$_{ME}$ included in the second extended sequence number ESQN$_{ME}$ included in a resynchronization pair (MACS, ESQN$_{ME}$) of example embodiments of the present invention.

In still another example embodiment, the first extended sequence number ESQN$_N$ included in the network authentication vector AV' includes a hash of the first hardware identifier ID$_N$, assuming that the intermediary IMS components 200a have a limited number of bits that may be transmitted to the mobile equipment 100. Referring back to step S120 of FIG. 6A, the mobile equipment 100 processes the first extended sequence number ESQN$_N$ extracted from the network authentication token AUTN'. If the first extended sequence number ESQN$_N$ includes a hash of the first hardware identifier ID$_N$, instead of the first hardware identifier ID$_N$, the processor 130 separates the first extended sequence number ESQN$_N$ into the first sequence number SQN'$_N$ and the hash of the first hardware identifier ID$_N$. The processor then obtains the second hardware identifier ID$_{ME}$ from the memory 120 of the mobile equipment 100, processes the second hardware identifier ID$_{ME}$ using the same hash function used by the network 20 to hash the first hardware identifier ID$_N$, and compares the hash of the second hardware identifier ID$_{ME}$ generated by the mobile equipment 100 with the hash of the first hardware identifier ID$_N$ provided by the network 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

We claim:

1. A method performed by mobile equipment to communicate with a network, the method comprising:
   receiving a network authentication token and random number, the network authentication token including a first message authentication code and a first extended sequence number that includes a first hardware identifier and a first sequence number; and
   authenticating the network based on the first message authentication code, the first hardware identifier, and the first sequence number, the authenticating including,
      extracting the first message authentication code and the first extended sequence number from the network authentication token,
      calculating a second message authentication code based on the random number, the first extended sequence number, and a key stored in the mobile equipment,
      processing the first extended sequence number to obtain the first hardware identifier and a first sequence number,
      comparing the first message authentication code with the second message authentication code, the first hardware identifier with a second hardware identifier stored in the mobile equipment, and the first sequence number and a second sequence number stored in the mobile equipment, and
      authenticating the network if the first message authentication code matches the second message authentication code, the first hardware identifier matches the second hardware identifier, and the first sequence number is greater than the second sequence number.

2. The method of claim 1, wherein the first hardware identifier refers to a mobile equipment associated with a subscriber of the network and the second hardware identifier identifies the mobile equipment that received the network authentication token and random number.

3. The method of claim 1, wherein the second sequence number is based on one of a time detected by the mobile equipment and a counter.

4. The method of claim 1, further comprising:
overwriting the first sequence number with the second sequence number if the second sequence number is greater than the first sequence number; and
testing a next obtained first sequence number with the second sequence number to validate the next obtained first sequence number.

5. The method of claim 1, further comprising:
obtaining the key stored in a removable unit identity module inserted into the mobile equipment;
performing a cryptographic transformation of the random number using the obtained secret key; and
transmitting the cryptographic transformation of the random number as a response if the authenticating step authenticates the network.

6. The method of claim 1, further comprising
generating a resynchronization pair if at least one of the first message authentication code does not match the second message authentication code, the first hardware identifier does not match the second hardware identifier, and the first sequence number is less than the second sequence number; and
transmitting the resynchronization pair to the network.

7. The method of claim 6, further comprising:
reallocating bits of a first protocol resynchronization pair, the first protocol synchronization pair having a preset number of bits assigned to each of a first protocol resynchronization message and a first protocol sequence number;
transmitting a second resynchronization pair having the same number of bits as the first protocol resynchronization pair, the bits reallocated in the reallocating step being used as bits of the second extended sequence number that has a greater number of bits than the first protocol sequence number.

8. The method of claim 1, wherein the generating step
concatenates the second hardware identifier and the second sequence number to create a second extended sequence number,
calculates a resynchronization message based on the random number, the second extended sequence number, and the key stored in the mobile equipment, and
groups the second extended sequence number with the resynchronization message to form the resynchronization pair.

9. A method performed by a network to communicate with mobile equipment, the method comprising:
transmitting a random number and a network authentication token to the mobile equipment, the network authentication token including a first extended sequence number that includes a hardware identifier of the mobile equipment associated with a subscriber;
receiving a response from the transmitting step, the response being at least one of a cryptographic transformation of the random number and a resynchronization pair including a second extended sequence number and a resynchronization message;
generating a first authentication vector including the network authentication token, the first authentication vector is a concatenation of the random number, an expected response, a cipher key, an integrity key, and the network authentication token;
comparing the response from the transmitting step to the expected response;

generating a second authentication vector if the response from the transmitting step does not match the expected response, the second authentication vector including a second network authentication token having the second extended sequence number and authenticating the mobile equipment if the response from the transmitting step matches the expected response.

10. The method of claim 9, further comprising:
transmitting the second network authentication token to the mobile equipment.

11. The method of claim 9, further comprising:
detecting an indicator included in the response from the transmitting step, the indicator indicating the response is one of a cryptographic transformation of the random number and the resynchronization pair;
authenticating the mobile equipment if the indicator indicates the response is the cryptographic transformation of the random number and the cryptographic transformation of the random number matches the expected response; and
generating the second authentication vector if the indicator indicates the response is the resynchronization pair; and
transmitting the second network authentication token to the mobile equipment.

12. The method of claim 9, further comprising:
reallocating bits of a first protocol network authentication token, the first protocol network authentication token having a preset number of bits assigned to each of a first protocol sequence number, authentication messaging field, and a message authentication code;
generating the second authentication vector, the second network authentication token being a second protocol network authentication token, the second network authentication token having the same number of bits as the first protocol network authentication token, the reallocated bits being used as bits of the first extended sequence number that has a greater number of bits than the first protocol sequence number; and
the transmitting step transmits the second network authentication token as the network authentication token.

13. A method of establishing a mutually authenticated communication channel between a mobile equipment and a network, the method comprising:
(a) generating an expected response, a random number, and a network authentication token, the network authentication token including a first message authentication code and a first extended sequence number that includes a first hardware identifier being associated with the mobile equipment by the network;
(b) transmitting the random number and the network authentication token from the network to the mobile equipment;
(c) receiving the random number and the network authentication token at the mobile equipment;
(d) authenticating the network based on the network authentication token, the authenticating (d) including,
extracting the first message authentication code and the first extended sequence number from the network authentication token,
calculating a second message authentication code based on the random number, the first extended sequence number, and a key stored in the mobile equipment,
separating the first extended sequence number to obtain the first hardware identifier and a first sequence number,
comparing the first message authentication code with the second message authentication code, the first hardware identifier with a second hardware identifier stored in the mobile equipment, and the first sequence number with a second sequence number stored in the mobile equipment, and authenticating the network if the first message authentication code matches the second message authentication code, the first hardware identifier matches the second hardware identifier, and the first sequence number is greater than the second sequence number;

(e) transmitting a cryptographic transformation of the random number from the mobile equipment to the network;

(f) authenticating the mobile equipment if the cryptographic transformation of the random number matches the expected response; and (g) establishing a mutually authenticated channel between the mobile station and the network.

14. The method of claim 13, further comprising:
resynchronizing the mobile equipment and the network if at least one of the first message authentication code does not match the second message authentication code, the first hardware identifier does not match the second hardware identifier, and the first sequence number is less than the second sequence number.

15. The method of claim 14, wherein resynchronizing step includes
concatenating the second hardware identifier and the second sequence number to create a second extended sequence number,
calculating a resynchronization message based on the random number, the second extended sequence number, and a key stored in the mobile equipment,
grouping the second extended sequence number with the resynchronization message to form the resynchronization pair,
transmitting the resynchronization pair,
generating a second network authentication token using the second extended sequence number, and
repeating the steps (b)-(f) substituting the second network authentication token for the network authentication token.

16. A method performed by mobile equipment to communicate with a network, the method comprising:
receiving a network authentication token and random number, the network authentication token including a first message authentication code and a first extended sequence number that includes a hash of a first hardware identifier and a first sequence number; and
authenticating the network based on the first message authentication code, the hash of the first hardware identifier, and the first sequence number, the authenticating including,
extracting the first message authentication code and the first extended sequence number from the network authentication token,
calculating a second message authentication code based on the random number, the first extended sequence number, and a key stored in the mobile equipment, and
processing the first extended sequence number to obtain the first hardware identifier and a first sequence number.

17. A method performed by a network to communicate with mobile equipment, the method comprising:
transmitting a random number and a network authentication token to the mobile equipment, the network authentication token including a first extended sequence number that includes a hash of a first hardware identifier and a sequence number;
receiving a response from the transmitting step, the response being at least one of a cryptographic transformation of the random number and a resynchronization pair including a second extended sequence number and a resynchronization message;
generating a first authentication vector including the network authentication token, the first authentication vector is a concatenation of the random number, an expected response, a cipher key, an integrity key, and the network authentication token;
comparing the response from the transmitting step to the expected response;
generating a second authentication vector if the response from the transmitting step does not match the expected response, the second authentication vector including a second network authentication token having the second extended sequence number and authenticating the mobile equipment if the response from the transmitting step matches the expected response.

* * * * *